United States Patent [19]

Kuroda

[11] 4,384,786
[45] May 24, 1983

[54] RECORDING APPARATUS

[75] Inventor: Yasuo Kuroda, Sagamihara, Japan

[73] Assignee: Canon Kabushiki Kaisha, Tokyo, Japan

[21] Appl. No.: 270,621

[22] Filed: Jun. 4, 1981

[30] Foreign Application Priority Data

Jun. 18, 1980 [JP] Japan ................................ 55-82514
Aug. 22, 1980 [JP] Japan ............................... 55-115414

[51] Int. Cl.³ ............................................. G03B 27/52
[52] U.S. Cl. .............................. 355/40; 355/14 CU; 355/64
[58] Field of Search ............... 355/14 CU, 39, 40–45, 355/64, 65, 28, 29

[56] References Cited

U.S. PATENT DOCUMENTS

| | | | |
|---|---|---|---|
| 3,682,544 | 8/1972 | Glaser | 355/14 CU |
| 3,682,546 | 8/1972 | Ross | 355/40 |
| 3,685,902 | 8/1972 | Blackert | 355/40 X |
| 4,076,412 | 2/1978 | Igarashi et al. | 355/28 |
| 4,093,370 | 6/1978 | Frech | 355/43 |

Primary Examiner—Richard A. Wintercorn
Attorney, Agent, or Firm—Fitzpatrick, Cella, Harper & Scinto

[57] ABSTRACT

A recording apparatus for recording images and auxiliary information on a long footage of film is provided with input means for inputting the number of images recordable on a predetermined length of strip film held by the holding portions of a film jacket having a plurality of holding portions for holding strip films and the number of the holding portions of the film jacket, first counter means for counting the images recorded on the long footage of film, second counter means for counting signals generated when the first counter means has counted the images recorded on the long footage of film by the number of images input to the input means, third counter means for counting signals generated when the second counter means has counted said signals by the number of holding portions input to the input means, and means for recording on the long footage of film information corresponding to the count value of the third counter means. The auxiliary information recorded on the long footage of film enables one to know the locations whereat the long footage of film is to be cut and strip films cut from the long footage of film can be properly held by a predetermined film jacket, whereby the possibility of mistaking the held position of the strip films is eliminated.

3 Claims, 10 Drawing Figures

RECORDING APPARATUS

BACKGROUND OF THE INVENTION

1. Field of the Invention

This invention relates to a recording apparatus for recording images and auxiliary information on a long footage of film.

2. Description of the Prior Art

A method is known whereby a number of originals are successively photographed on a long footage of film and the film is developed. Thereafter the film is cut into a predetermined length and the cut films (hereinafter referred to as the strip films) are loaded into the pockets (bag portions) of a film jacket having a plurality of pockets, whereby a microfiche having a number of frames arranged in a matrix-like form is prepared. Where a microfiche is to be prepared by the use of such a method, there has been encountered problems such as one mistakes the locations whereat the long footage of film is to be cut, or one mistakes the locations whereat the strip films are loaded, or one loads the strip films while mistaking the obverse and reverse thereof. There has also been encountered a problem that even if strip films were properly loaded into predetermined pockets of a film jacket, when the strip films are to be put back in their place after having been withdrawn from the film jacket, one loads them into a wrong film jacket by mistake.

SUMMARY OF THE INVENTION

It is an object of the present invention to eliminate the above-noted disadvantages.

It is another object of the present invention to make strip films from a long footage of film having a number of images recorded thereon and to facilitate the handling of such strip films.

It is still another object of the present invention to record auxiliary information as well as a number of images on a long footage of film.

It is yet still another object of the present invention to provide a recording apparatus which enables predetermined strip films to be made by cutting a long footage of film at predetermined locations thereof and thus enabling these strip films to be properly held by a film jacket.

The invention will hereinafter be described with respect to some specific embodiment thereof shown in the accompanying drawings.

DESCRIPTION OF THE PREFERRED EMBODIMENTS

Figure 1:
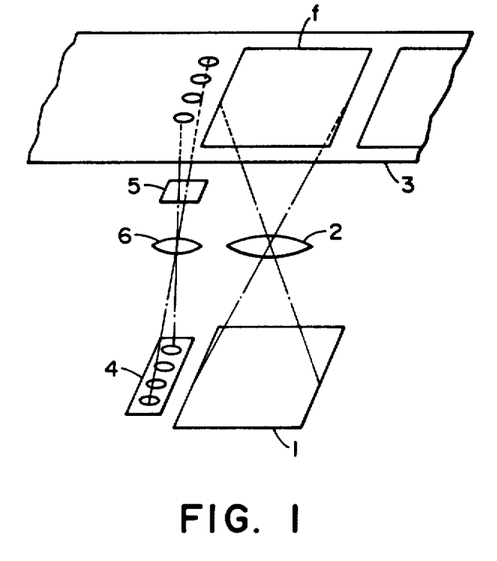
FIG. 1 schematically shows the construction of the photographing apparatus according to an embodiment of the present invention.

FIG. 1 shows a photographing apparatus to which the present invention is applied. The photographing apparatus has an original photographing portion and an auxiliary information photographing portion. An original 1 such as a drawing or a document placed on the original supporting table of the original photographing portion is photographed into the frames of a microfilm 3 through a projection lens 2 in the original photographing portion. The details of the original photographing portion for photographing the image of the original into the microfilm are well known and therefore need not be described.

The auxiliary information photographing portion has an information display portion 4, a shutter 5 and a lens 6, and the information displayed by the display portion 4 is photographed onto one side of the frame f on the microfilm through the projection lens 6 when the shutter 5 is opened.

Figure 2:
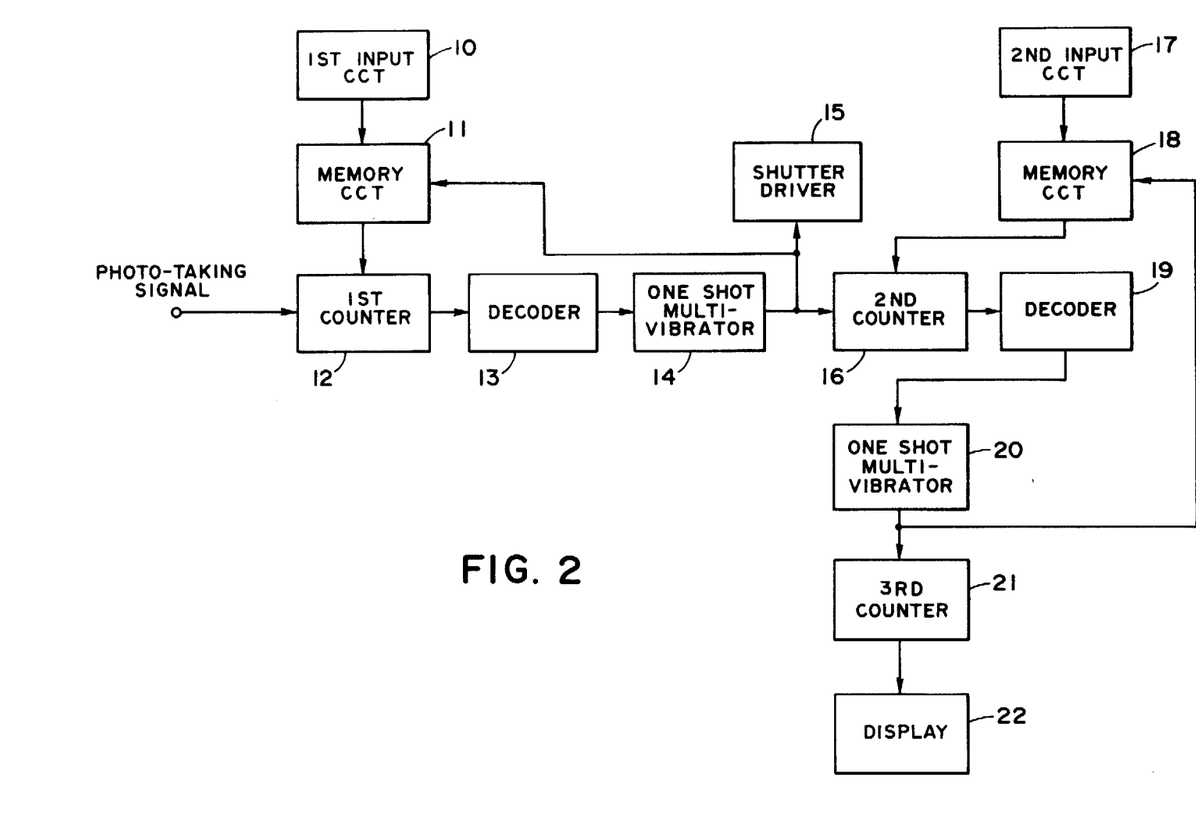
FIG. 2 diagrammatically shows the recording control circuit.

FIG. 2 shows the recording control circuit of the above-described apparatus. Reference numeral 10 designates a first input circuit for inputting the number of originals photographable on a predetermined length of strip film that can be contained in a pocket of a film jacket. Reference numeral 11 denotes a memory circuit for storing therein the number of originals inputted into the first input circuit, and reference numeral 12 designates a first counter in which the number of originals stored in the memory circuit is preset. This first counter 12 comprises a preset type counter in which, when the number of originals has been inputted into the first input circuit 10, that number of originals is preset. The counter subtracts and counts photographing signals generated from the original photographing portion in association with an original photographing operation and returns to its start condition when a predetermined count value is reached. As the photographing signal, utilization may be made of, for example, a signal generated when a photographing instruction button is operated or a signal for driving the shutter for opening-closing the original projection light path, and such signal is generated each time an original is photographed. A well-known keyboard or the like is used as the first input circuit 10.

Designated by 13 is a decoder which puts out a signal when the count value of the first counter 12 has reached a predetermined value. This decoder puts out a signal when the number of originals input to the first inputted into circuit 10 and the number of photographing signals inputted into the first counter have become coincident with each other, namely, when the count value of the first counter has become zero. A comparison circuit may be provided instead of the decoder, the first counter may be comprised of an addition counter, and the number of originals stored in the memory circuit may be compared with the content of the addition counter by the comparison circuit. Reference numeral 14 designates a one shot multi-vibrator circuit which puts out a pulse signal when it receives the output signal from the decoder 13. Reference numeral 15 denotes a shutter driven circuit which is operated by the pulse signal from the one shot multi-vibrator circuit 14 and which opens the shutter 5 when it receives the pulse signal. The pulse signal of the one shot multi-vibrator circuit 14 is sent to the memory circuit 11, which, upon reception of this pulse signal, presets the stored number of originals to the first counter 12.

Denoted by 16 is a second counter which subtracts and counts the pulse signal of the one shot multi-vibrator circuit 14. Reference numeral 17 designates a second input circuit for inputting the number of pockets of the film jacket, and reference numeral 18 denotes a memory circuit for storing the number of pockets input to the second input circuit. The second counter 16 comprises a preset type counter in which when the number of pockets has been input to the second input circuit 17, that number is preset and returns to its start condition when a predetermined count value is reached. Designated by 19 is decoder which puts out a signal when the count value of the second counter 16 has become a predetermined value. This decoder 19 puts out a signal when the number of pockets inputted into the second input circuit 17 and the number of pulse signals generated by the one shot multi-vibrator circuit 14 have become coincident with each other, namely, when the count value of the second counter has become zero. A comparison circuit may be provided instead of the decoder 19, the second counter may be comprised of an addition counter, and the number of pockets stored in the memory circuit 18 may be compared with the content of the addition counter by the comparison circuit. Reference numeral 20 designates a one shot multi-vibrator circuit which puts out a pulse signal upon reception of the output signal from the decoder 19, reference numeral 21 denotes a third counter for counting the pulse signal of the one shot multi-vibrator circuit 20, and reference numeral 22 designates a display device for displaying information corresponding to the count content of the third counter 21. The pulse signal of the one shot multi-vibrator circuit 20 is sent to the memory circiut 18 which, upon reception of this pulse signal, presets the stored number of pockets to the second counter 16. The third counter 21 comprises an addition counter, and the display device 22 comprises a well-known liquid crystal display device or a light-emitting diode display device and displays the count content of the third counter 21 by a four-figure number in a decimal expression. The display number of the display device 22 is displayed on the display portion of FIG. 1.

Operation of the above-described apparatus will now be explained. Assume that the number of originals (the number of images) that can be recorded on a predetermined length of strip film which can be contained in a pocket of the film jacket is N. This number of originals N corresponds to the number of originals of a unit to be inputted into the first input circuit 10. The number of originals N inputted into first input circuit 10 is stored in the memory circuit 11 and preset to the first counter 12. Also, assuming that the number of pockets of the film jacket is M, this number is inputted into the second input circuit, and stored in the memory circuit 18 and preset to the second counter 16. Next, among the group of originals of a unit, the first original to be photographed is placed on the original supporting table, and the photographing instruction button is depressed, whereby the image of the original is photographed into the frame of the microfilm 3. After the photographing has been terminated, the microfilm 3 is fed by an amount substantially corresponding to one frame. At this time, the count value of the first counter 12 becomes N−1. Subsequently, the second original is placed on the original supporting table, whereafter the original is photographed in the same manner as that described above, whereupon the count value of the first counter 12 becomes N−2. As described above, each time an original is photographed, a photographing signal is generated from the original photographing portion and this photographing signal is sent to the first counter 12, which subtracts and counts this signal.

When the photographing signal generated from the original photographing portion and when the Nth original, namely, the last original of the original group of a unit, is photographed, and is subtracted and counted by the first counter 12, the count content of the first counter 12 becomes zero and a pulse signal is generated from the one shot multi-vibrator circuit 14 through the decoder 13. This pulse signal is subtracted and counted by the second counter 16 and the count value of the second counter 16 becomes M−1. On the other hand, the shutter 5 is opened by the pulse signal of the one shot multi-vibrator circuit 14 through the shutter driver circuit 15 and the number displayed by the display device 22 is photographed on one side of the frame in which the last original has been photographed. The original and the information of the display device 22 are photographed on the microfilm simultaneously or successively. Accordingly, the information of the display device 22 is photographed on the microfilm only when the last original of the original group of a unit is photographed. It is to be understood that "0000" is displayed on the display device 22 at this time. On the other hand, the pulse signal of the one shot multi-vibrator circuit 14 is sent to the memory circuit 11, whereby the number of originals N stored in the memory circuit 11 is again preset to the first counter 12. Subsequently, a new original group of a unit (the number of originals of which is the same as the aforementioned unit) is photographed in the same manner as that described above. When the last original of the new original group is photographed, the number "0000" displayed by the display device 22 is recorded on the microfilm in the same manner as that described previously. Thereafter, as described above, each time the last original of the original group of a unit is photographed, the same number is photographed on one side of the frame in which this original has been photographed. Each time the original group of a unit is photographed, the number of pockets M preset in the second counter 16 is subtracted and, when the original group of a unit is photographed M times, the count value of the second counter 16 becomes zero. At this time, a pulse signal is put out from the one shot multi-vibrator circuit 20, and this pulse signal is added and counted by the third counter 21, and the number displayed by the display device 22 becomes "0001." As a result, when a new original group of a unit is photographed, the number "0001" displayed by the display device 22 is recorded on the microfilm when the last original of the original group of a unit is photographed. Accordingly, numbers are recorded at every predetermined number of frames on the microfilm, and the same numbers are recorded on the portion of the microfilm contained in the same jacket (which is severed and provides strip films corresponding to the number of pockets), while different numbers are recorded on the portion of the microfilm contained in each jacket. Thus, a number C−1 is recorded on the portion of the microfilm contained in the Cth jacket. The displayed number may begin with "0001".

Figure 3:
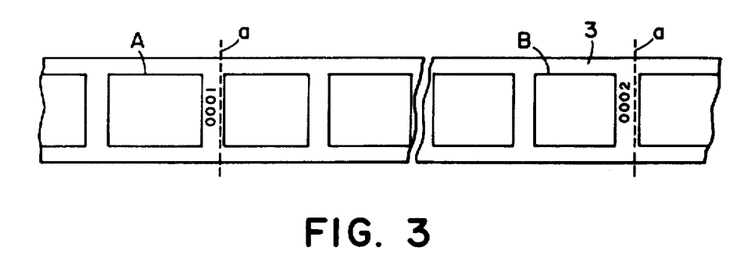
FIG. 3 is a front view of a microfilm prepared by the present invention.

FIG. 3 shows a microfilm prepared by the above-described apparatus. Originals are photographed in the successive frames of the microfilm 3 from left as viewed in FIG. 3, and the last frame of the original group of a unit is indicated by A, and the number displayed by the display device 22 is recorded as reference auxiliary information on one side of this frame A. B designates the last frame of the original group of a unit contained in another jacket, and a number different from the aforementioned one is recorded on one side of the frame B.

Figure 4A:
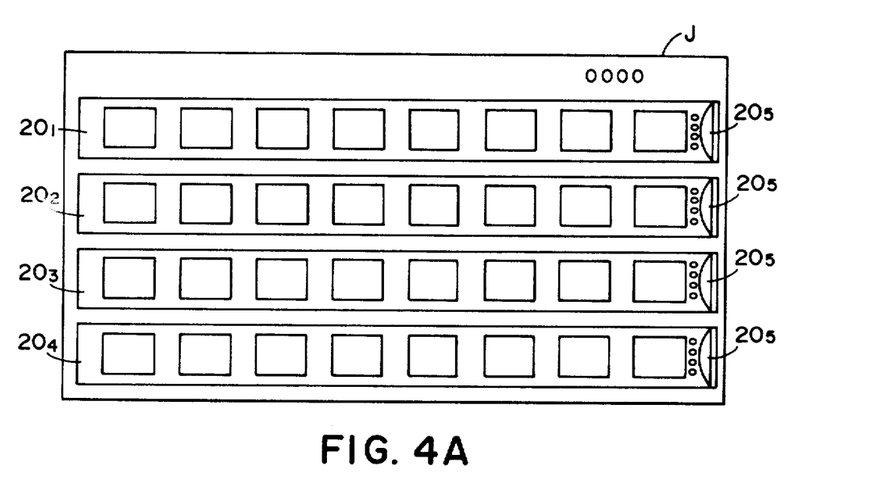
FIGS. 4A and 4B are front views of film jackets with strip films loaded therein.
Figure 4B:
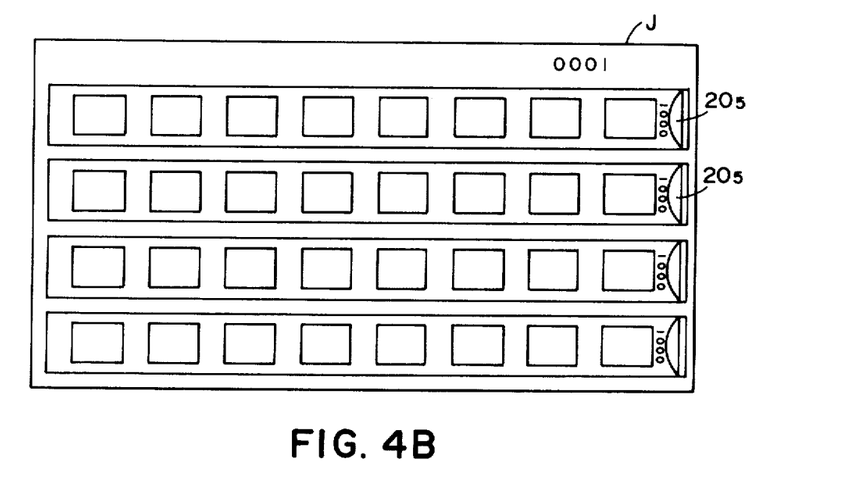

The microfilm 3 is cut along the line a on the right of the reference number, and each strip film has the same number of frames and the same length. This strip film is held by a film jacket shown in FIGS. 4A and 4B. FIGS. 4A and 4B show a film jacket holding the strip films. The film jacket J comprises two transparent sheets and has four rectangular pockets $20_1$-$20_4$ for holding the strip films. Each pocket is blockaded at three sides thereof and has at remaining one side thereof an inlet $20_5$ through which the strip film may be put in and out, and the strip film is inserted from the inlet of each pocket with the sensitized surface of the film facing downwardly. The same number as the number recorded on the strip film to be contained in each pocket is written in the right upper portion of each film jacket, whereby the strip film and the film jacket can be made to properly correspond to each other. The film jacket is not restricted to the above-described embodiment, but there are various types of film jacket including one which holds the strip film by sticking the strip film thereon, and any of these film jackets is usable. Each strip film can be properly loaded into a predetermined film jacket by inserting the strip film into the pocket of each film jacket so that the reference number on the film jacket and the number recorded on the strip film are coincident with each other when the strip film is loaded into the film jacket.

The microfilm having recorded thereon images and auxiliary information can be properly severed at a predetermined location by utilizing this information, and the severed strip film can be properly loaded into a predetermined film jacket.

In the above-described embodiment, the information displayed by the display device is photographed when the last original of the original group of a unit is photographed, but alternatively, the displayed information may be photographed when the first original is photographed.

In the above-described embodiment, if the number of frames that can be contained in a pocket of the film jacket differs, the number of originals input to the first input circuit may be changed and, if the number of pockets of the film jacket differs, the number of pockets input to the second input circuit may be changed.

Figure 5:
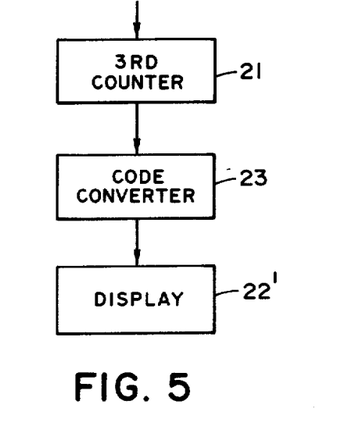
FIG. 5 shows another embodiment of the display device.

FIG. 5 shows another embodiment of the display device. The display device 22' displays thereon character information such as alphabet (A, B, C, ...) corresponding to the count content of the third counter 21. Designated by 23 is a code converter circuit for code-converting the count value of the third counter.

Figure 6:
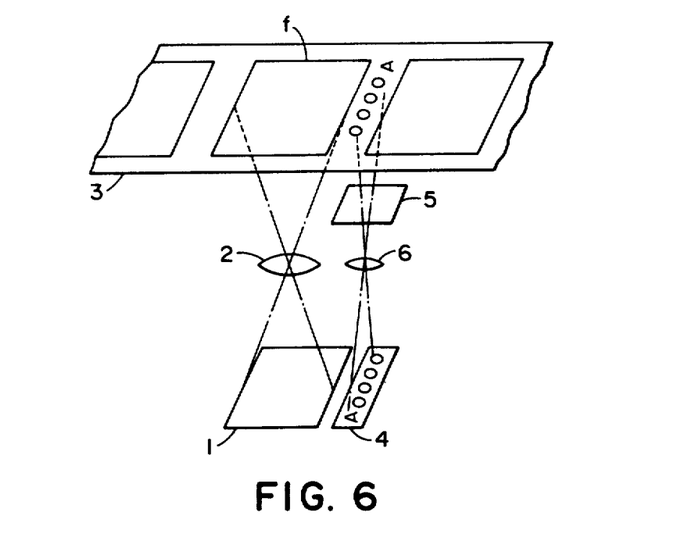
FIG. 6 is a schematic view showing another embodiment of the recording apparatus.

FIG. 6 shows another embodiment of the recording apparatus. In FIG. 6, members which are functionally similar to those of FIG. 1 are given similar reference characters. In FIG. 6, reference numeral 40 designates an auxiliary information display portion, and the information displayed by the display portion 40 is recorded on one side of a frame f through a lens 6.

Figure 7:
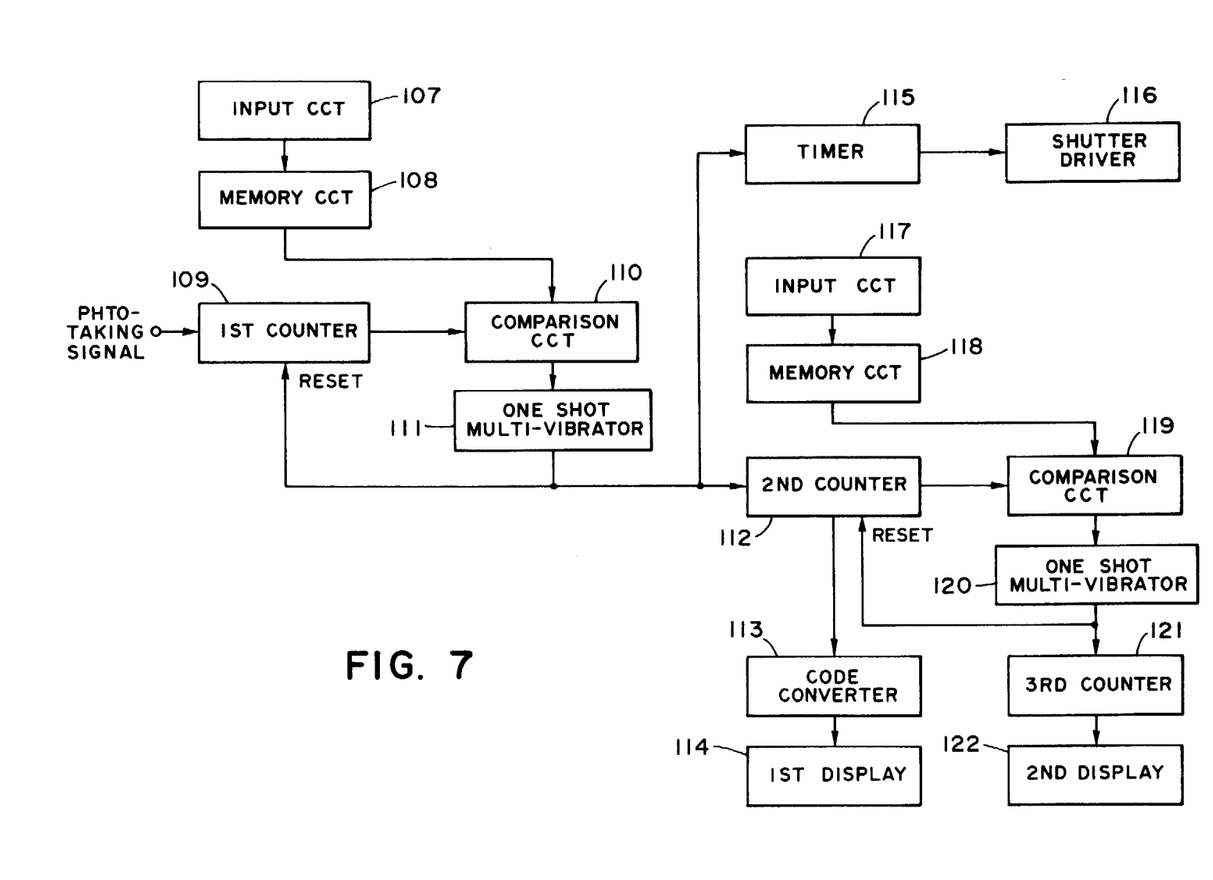
FIG. 7 diagramatically shows another embodiment of the recording control circuit.

FIG. 7 shows the recording control circuit of the recording apparatus shown in FIG. 6. Reference numeral 107 designates an input circuit for inputting the number of originals photographable on a predetermined length of strip film that can be contained in a pocket of a film jacket, reference numeral 108 denotes a memory circuit for storing the number of originals input to the input circuit, and reference numeral 109 designates a first counter for counting the number of originals photographed in the photographing portion. This first counter 109 adds and counts a photographing signal generated from the original photographing portion in association with the original photographing operation. A well-known keyboard or the like is used as the input circuit 107. Designated by 110 is a comparison circuit which compares the count content of the first counter 109 with the stored content of the memory circuit 108 and puts out a coincidence signal when the count value of the first counter has become a number corresponding to the number of originals stored in the memory circuit. Reference numeral 111 designates a one shot multi-vibrator circuit which puts out a pulse signal upon reception of the coincidence signal from the comparison circuit 110, and reference numeral 112 denotes a second counter which adds and counts the pulse signal of the one shot multi-vibrator circuit 111. Reference numeral 113 designates a code converter circuit for code-converting the count content of the second counter 112. The content code-converted by this code converter circuit 113 is displayed by a first display device 114. The code converter circuit 113 converts the count value of the second counter into alphabetical characters, for example, and the first display device 114 displays the alphabetical characters. Reference numeral 115 designates a timer circuit operated by the pulse signal of the one shot multi-vibrator circuit 111, and reference numeral 116 denotes a shutter driver circuit which receives the output of the timer circuit 115 and drives the shutter 5 of the auxiliary information photographing portion. Also, the pulse signal of the one shot multi-vibrator circuit 111 is sent to the first counter 109 to reset the first counter. Reference numeral 117 designates an input circuit for inputting the number of pockets of the film jacket used. Reference numeral 118 denotes a memory circuit for storing the number of pockets inputted into the input circuit. Reference numeral 119 designates a comparison circuit which compares the stored content of the second counter 112 with the stored content of the memory circuit 118 and puts out a coincidence signal when the count value of the second counter 112 has become a number corresponding to the number of pockets stored in the memory circuit 118. Reference numeral 120 designates a one shot multi-vibrator circuit which puts out a pulse signal when it receives the coincidence signal from the comparison circuit 119, and reference numeral 121 denotes a third counter which adds and counts the pulse signal of the one shot multi-vibrator circuits 120. Designated by 122 is a second display device for displaying the count content of the third counter 121. The display information of the first and second display devices 114 and 122 is displayed on the display portion 40 of FIG. 6.

Operation of the above-described apparatus will now be explained. Assume that the number of originals photographable on the strip film that can be contained in a pocket of the film jacket is N. This number of originals N corresponds to the number or originals of a unit to be input to the input circuit 107, and the number of originals N input to the input circuit 107 is stored in the memory circuit 108. Subsequently, an original is placed on the original supporting table, the photographing instruction button is depressed and the image of the original is photographed into a frame of the microfilm 3. After termination of the photographing, the microfilm 3 is fed by an amount substantially corresponding to a frame. Next, a second original is placed on the original supporting table, and this original is photographed in the same manner as that described above. Each time an original is photographed, a photographing signal is generated from the original photographing portion and this photographing signal is sent to the first counter 109, which adds and counts this signal.

When the photographing signal generated from the original photographing portion and when the Nth original is photographed and is added and counted by the first counter 109, a coincidence signal is put out from the comparison circuit 110 and a pulse signal is generated from the one shot multi-vibrator circuit 111. This pulse signal is added and counted by the second counter 112. The count value of the second counter 112 is code-converted and displayed as "A" by the first display device 114. On the other hand, the timer circuit 115 is operated by the pulse signal of the one shot multi-vibrator circuit 111, whereby the shutter 5 is opened through the shutter driver circuit 116 and the display contents of the first and second display devices 114 and 122 are photographed on one side of a frame. At this time, the count value of the third counter 121 becomes "0000" and accordingly, "0000-A" is displayed on the display portion 40 and this displayed information is recorded on the microfilm. The display contents of the first and second display devices are photographed simultaneously or successively when the last original of the original group of a unit is photographed.

On the other hand, the pulse signal of the one shot multi-vibrator circuit 111 is sent to the first counter 109 to reset this counter. Subsequently, a new original group of a unit is photographed in the same manner as that described previously. When the last original of the new original group is photographed, the display content of the first display device 114 becomes "B" and "0000-B" is recorded on the microfilm.

The above-described operation is repeated and when the count content of the second counter 112 has become coincident with the stored content of the memory circuit 118, namely, when photography is effected on a predetermined length of strip film that can be inserted into each pocket of the same jacket, a coincidence signal is put out from the comparison circuit 119. At this time, the pulse signal put out from the one shot multi-vibrator circuit 120 is added and counted by the third counter 121 and the second display device 122 displays "0001."
On the other hand, the second counter 112 is reset by the pulse signal of the one shot multi-vibrator circuit 120. It is to be understood that the information displayed by the display portion 40 is recorded on the microfilm before the second counter is reset and the content of the second display device is varied. The originals photographed thereafter are loaded into another film jacket, but the subsequent display by the display portion changes to "0001-A", "0001-B", "0001-C", . . . in accordance with the progress of the photography. Accordingly, if this microfilm is cut into a predetermined length of strip film, the same number indicative of the fact that the strip film is to be contained into a common jacket and an alphabetical character indicative of a pocket of the same jacket into which each strip film is to be inserted are recorded on each strip film.

Figure 8:
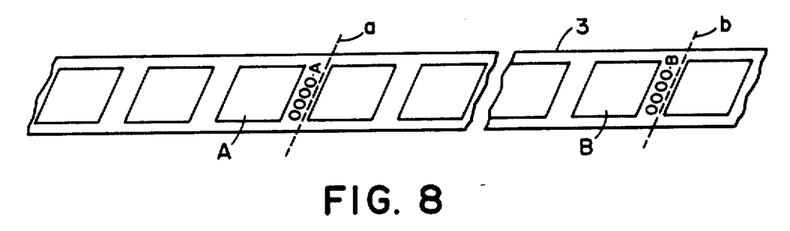
FIG. 8 is a front view of a microfilm with images and auxiliary information recorded thereon by the recording apparatus of FIG. 6.

FIG. 8 shows a microfilm prepared by the above-described apparatus. On the microfilm 3, originals are photographed in the successive frames from left as viewed in FIG. 8, and the last frame of the first original group of a unit is indicated by A and auxiliary information "0000-A" is recorded on one side of the frame A. B indicates the last frame of the second original group of a main and auxiliary information "0000-B" is recorded on one side of this frame. Thus, the information indicative of the address of the film jacket and pocket in which the strip film is to be contained is recorded in the last frame of the original group of a unit.

Figure 9:
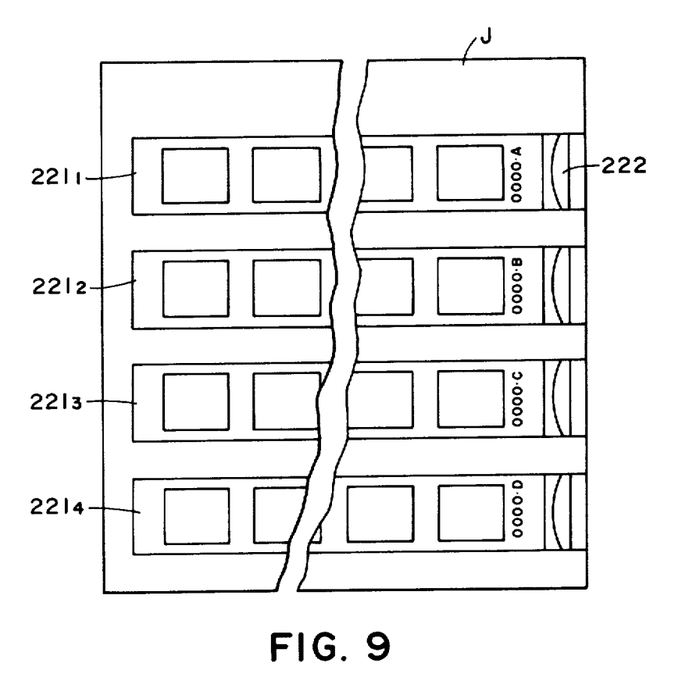
FIG. 9 shows strip films made from the microfilm of FIG. 8 and loaded into a film jacket.

The microfilm 3 is cut along lines a and b on the right of the reference numbers and each strip film has the same number of frames and the same length. The strip films are loaded into the film jacket shown in FIG. 9. FIG. 9 shows the film jacket with the strip films loaded thereinto. The film jacket J comprises two transparent sheets and has four pockets $221_1$–$221_4$ for containing the strip films therein. Each pocket is blockaded at three sides thereof and the remaining one side has an inlet 222 through which the strip film may be put in and out, and the strip film may be inserted into each pocket through the inlet thereof. When each strip film is to be loaded into the jacket, one can see the numbers and alphabetical characters recorded on the strip films and insert the strip films into the pockets of the jacket in the order of the numbers and alphabetical characters, whereby one can properly load each strip film into a predetermined location of the jacket.

By utilizing the auxiliary information recorded on the microfilm, one can properly cut the microfilm at predetermined locations thereof and load strip films into the jacket in a proper order. Also, from among numerous strip films, one can simply find out the strip film to be contained in a predetermined pocket of the jacket.

What I claim is:

1. An image recording apparatus for processing a long film into cut film strips of a predetermined length, the film strips adapted to be accommodated in pockets of a film jacket; said apparatus comprising:
   first recording means for recording images on the long film in succession;
   input means for inputting the number of images which can be contained in the film strip of the predetermined length and the number of the pockets of the film jacket;
   first counter means for counting, in response to the operations of said first recording means, the number of images formed on the film and for producing a signal when a number corresponding to said number of images inputted by said input means;
   second counter means for counting the signals produced by said first counter, and for producing a signal and resetting when a number corresponding to said number of the pockets inputted by said input means;
   third counter means for counting the signals produced by said second counter means; and
   second recording means for displaying information corresponding to the number counted by said third counter means, and for recording the displayed information for each strip of the predetermined length of the film.

2. An apparatus according to claim 1, wherein said second recording means carries out its recording operation in response to the signals produced by said first recording means.

3. An apparatus according to claim 2, further comprising said recording means for displaying information corresponding to the number counted by said second counter means, and recording the displayed information for each strip of the predetermined length of the film.

* * * * *